Feb. 5, 1952 M. CORNELL 2,584,424
METHOD AND APPARATUS FOR TREATING FLUID MATERIALS
Filed Oct. 26, 1946

INVENTOR.
MEAD CORNELL
BY
Oberlin & Limbach
ATTORNEYS

Patented Feb. 5, 1952

2,584,424

UNITED STATES PATENT OFFICE 2,584,424

METHOD AND APPARATUS FOR TREATING FLUID MATERIALS

Mead Cornell, Cleveland, Ohio, assignor to The Cornell Machine Company, Cleveland, Ohio, a corporation of Ohio Application October 26, 1946, Serial No. 705,904

12 Claims. (Cl. 260—417)

This invention relates to a method and apparatus for treating fluid materials and is an improvement on the inventions disclosed in certain of my prior patents hereinafter set forth.

One of the principal objects of the present invention is to provide a method and apparatus for mechanically mixing fluid materials, such as liquid, colloidal, or mixtures of liquid and colloidal, materials with each other and with dry materials, more intimately and mechanically to change the resultant mixtures from a liquid or colloidal state into a finer colloidal state or into a solid or semi-solid state.

Another object is to attenuate centrifugally colloidal suspensions of certain materials, and also mixtures of certain solid materials and liquids, into films of less thickness than the diameter of the smallest particles of the suspended or solid material, thereby effecting a further reduction in the size of the solid particles and concurrently a more intimate mixture or suspension.

Another object is to treat a mixture of materials including solid particles and liquids by centrifugally attenuating the mixture into continuous film of microscopic thickness.

Another object is to attenuate mixtures of such materials centrifugally into a continuous film of extreme thinness and concurrently to subject and treat the film with gaseous media at predetermined positive or negative pressures, and to maintain the continuity of the film while it is subjected to such conditions for a sufficient interval to cause the mixture of materials to change from a liquid or highly plastic to a solid or semisolid state.

Another object is to provide an apparatus through which the materials to be treated are fed continuously, and during their passage therethrough are continuously centrifugally attenuated into a continuous film of less thickness than those heretofore obtainable, intimately mixed, deaerated, dehydrated, and changed from a liquid to a solid or a semi-solid state during attenuation, and from which the solid or semi-solid mixture of material is removed continuously without interruption of the mixing, attenuation, deaeration or dehydration.

A more specific object is to provide an improved and continuous method and apparatus for making soaps, greases, and like products.

Other objects and advantages will become apparent from the following description in which reference is made to the drawings in which.

Figures 1, 2:
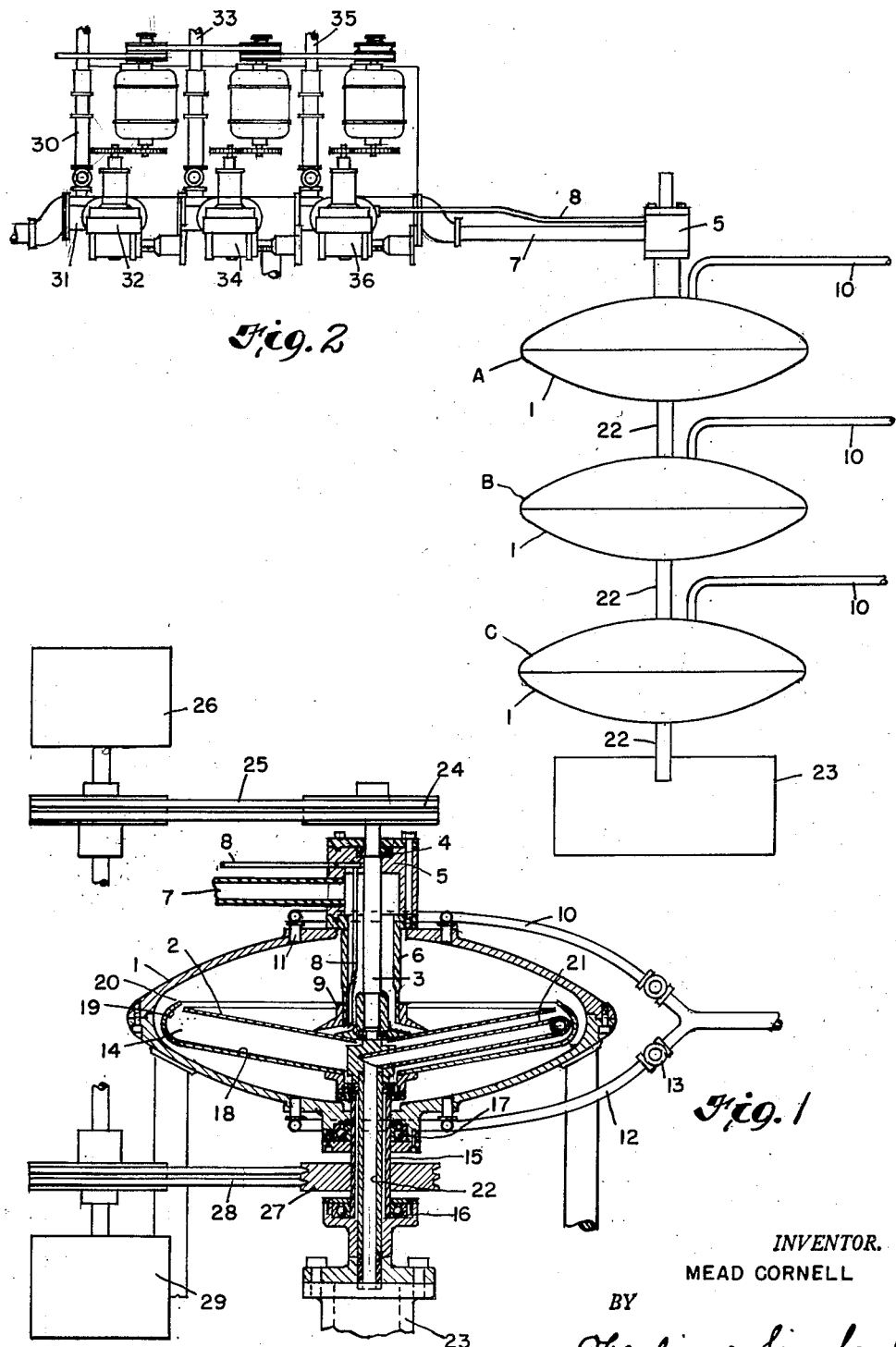
Figure 1 is a longitudinal sectional view through an apparatus embodying the principles of the present invention.
Figure 2 is a diagrammatic illustration of the apparatus as used for the production of soap, greases and the like in accordance with the present method.

As mentioned in the objects, the present invention is an improvement on certain of my U. S. Letters Patent. In my U. S. Patent No. 2,042,080, issued on June 2, 1936, entitled Homogenizer, there is described an attenuating apparatus comprising essentially a centrifugating disc onto the center portion of which materials in mixed condition are fed and spread by a suitable spreader into a thin film which is further attenuated centrifugally during its travel radially across the spinning disc. The material upon leaving the disc as a film accumulates on the side walls of a surrounding container from which it is subsequently drained away. In such a structure, attenuation of an already mixed mass of material is effected. Instead, during all of the operations, the material is in a liquid or highly plastic state. However, the apparatus does not lend itself to continuous methods of production and does not change the mixture from a liquid to a solid or semi-solid condition.

In my U. S. Patent No. 2,273,385, issued February 24, 1942, entitled Apparatus for Treating Fluid Materials, there is disclosed an apparatus which is an improvement on that of my prior patent just described, in which two attenuating discs are employed and the materials to be mixed are fed separately to the centers of the different discs, respectively, and thereby mixed after attenuation and collected in liquid or highly plastic condition.

In order to attenuate and more intimately intermix materials of a lesser degree of plasticity, the structure such as shown in my U. S. Patent No. 2,318,293, issued May 4, 1943, entitled Material Treating Process and Apparatus, is used. In this apparatus instead of the revolving discs, the container itself is revolved, the container having walls which are concave toward each other and joined peripherally to form a collecting trough.

A mixture of materials is fed continuously into the apparatus and attenuated along one of the inner walls of the casing until it accumulates in the peripheral trough from which it is removed by a scoop which is connected to a conduit leading out of the casing. This apparatus, while capable of handling liquids or flowable plastics does not provide as good dearation and dehydration as is obtainable with the earlier structures.

With none of the above structures is it possible to remove all of the water and liquid. However, in order to change from a solid to a semi-solid state, it is necessary to deaerate and dehydrate the mixture, and it is preferable to effect the deaeration and dehydration during the attenuation of the material. At the same time, for effective operation it is necessary that the materials to be mixed, attenuated and changed in condition, be fed continuously into the apparatus and be removed continuously therefrom even though upon removal they are in a solid or semi-solid state. For this purpose the present structure has proven satisfactory.

As illustrated in Figure 1, the apparatus comprises generally an outer casing 1 which is stationary and sealed to prevent the escape of materials therefrom and to permit the creation of a positive or negative pressure therein. The casing preferably is circular in section normal to its axis and elliptical in section through its axis. Mounted within the casing in coaxial relation thereto is a coniform centrifugating member or disc 2 which, in general, is such as described in my first two above identified patents. The disc 2 is mounted on a shaft 3 which is supported in suitable bearings 4 in a housing 5 which is securely fastened to the outer casing 1. The housing 5 has a sleeve portion 6 which extends into the interior of the casing 1 in surrounding and radially spaced relation to the shaft 3. A suitable inlet conduit 7 for admission of a mixture of materials to be further mixed and treated, is connected at one end to the housing 5 and communicates with the interior of the sleeve 6 so as to permit feeding materials into the interior of the casing 1 at the inner margin of the disc 2. Since, in some instances, it is desirable not to mix the materials until after they have been introduced to the disc, a supplemental feed line or pipe 8 extends into the housing 5 and through the sleeve 6 and substantially to the attenuating surface of the disc 2 so as to feed the material directly to the disc so as to prevent its admixture to other material prior to the introduction of all of the materials to the attenuating surface of the disc. In order to spread the materials immediately into a film at the instant they are introduced to the center portion of the disc 2, a suitable spreader 9 is provided, the spreader 9 being mounted on the outer surface of the sleeve 6 with its lower or spreading edge in slightly spaced relation to the upper or attenuating surface of the disc 2. The structure thus described provides a means for feeding material to the inner margin of the disc surface in the form of a continuous film and can operate essentially in the same manner as the structure described in my U. S. Patent No. 2,042,880 with the additional advantage that the materials may be fed unmixed to the attenuating surface.

The upper or attenuating surface of the disc 2 of the present structure is more steeply inclined than that of the disc in my last mentioned patent. For example, the generating element of the inner conical surface of the disc 2 is inclined at an angle of from 5° to 20° to the plane normal to the axis of the disc, thus providing, in comparison to my earlier patented structures, a greater component of the centrifugal force for holding the material against the attenuating surface of the disc and accordingly increasing the pressure of the material against the attenuating surface while proportionately decreasing the component of the centrifugal force which moves the material outwardly generally radially along the attenuating surface. By the proper ratios of feed, speed and the angle of inclination of the attenuating surface a continuous microscopic film is formed which is of less thickness than the diameter of the smallest solid particle contained in the mixture. With proper deaeration and dehydration, a film of such thickness can be caused to change from a liquid or highly plastic material to a solid or semi-solid condition before it leaves the periphery of the disc and yet flow over the surface of the disc while held in intimate engagement therewith. In order to deaerate and dehydrate the film thus formed, a suitable pipe line 10 is connected to the casing 1, preferably at a plurality of openings 11 which are arranged above the disc between its center and outer margin. The line 10 may be connected to a pressure source of treating gas or may be connected to a source of subatmospheric pressure. When the line 10 is connected to a source of subatmospheric pressure the entire film, during attenuation, is subjected to subatmospheric pressure so that the air and water are readily vaporized and removed, the capacity of the pump or other source of subatmospheric pressure being adequate for this purpose. A branch line 12 is provided and connected through a normally closed valve 13 to the interior of the casing 1 for removing any material or water that may escape from the disc and drain to the bottom of the casing.

Having attenuated the film to the degree desired and rendered the resultant mixture solid or semi-solid before it leaves the disc, the next step is continuously to remove it from the casing 1. For this purpose, a centrifugal collector member or collector 14 is provided and is generally in the form of a shallow receptacle having an upturned and inwardly curved outer margin. The collector 14 has a hollow extension 15 which is rotatably mounted in suitable bearings 16 and 17 and which supports the collector within the casing in coaxial and surrounding relation to the disc 2 and for rotation independently thereof. The collector 14 preferably has a sloping bottom wall 18 which is inclined upwardly and outwardly from its axis and is provided at its outer periphery with a trough portion 19, the upper edge of which, as indicated at 20, is above the upper or attenuating surface of the disc 2 and is spaced slightly outwardly therefrom. By having the upper end of the collector open, the entire upper surface of the film on the attenuating surface is most efficiently exposed to the gaseous media or to subatmospheric pressure. The subatmospheric pressure condition at the open top of the collector is greatly augmented by the high speed rotation of the collector itself. In fact, once a subatmospheric pressure has been initiated in the casing due to the opening of the valve in the line 10, the co-rotating disc 2 and collector thereafter create and maintain a much more intense subatmospheric over the surface of the disc and all that is required of the pipe 10 thereafter is that it, either alone or in conjunction with the discharge conduit for the material, later to be described, carry off the freed vapors. The materials discharged from the disc passes directly into the trough portion 19 of the collector 14 as solid or semi-solid and there is held by centrifugal force.

Within the collector 14 is a suitable stationary scoop 21 which extends from the axis of the collector 14 outwardly into the trough 19 and which has an opening in its outer end facing against the direction of rotation of the collector 14. Thus the material in the trough 19, due to its peripheral velocity is intercepted by the open end of the scoop 21 and is forced to travel through the scoop toward the axis of the collector. Within the extension 15 of the collector is a hollow conduit 22 which is connected at one end to the inner end of the scoop 21 and forms therewith a continuous passage from the open end of the scoop to the outside of the casing 1. The opposite or outer end of the conduit 22 is connected to the inlet 23 of a suitable pump by which the material is handled after it is discharged from the casing 1. It should be noted that even though there is a high degree of subatmospheric pressure in the casing 1, there is a high positive pressure in the conduit 22, due to the forces applied to the material therein by the material in the trough.

In order to rotate the disc 2, a suitable pulley 24 is connected to the shaft 3 and is driven through suitable means such as a belt 25 and a reversible variable speed transmission 26, the source of power not being shown. The collector 14 is driven by a suitable source of power, not shown, through a suitable pulley 27 which is connected to the extension 15, suitable belts 28, and a variable speed transmission 29.

With the structure thus described, the materials may be fed in mixed condition or separately to the attenuating surface of the disc 2 and attenuated and intimately mixed, deareated and dehydrated during the passage thereof, discharged therefrom in a solid or semi-solid condition, and centrifugally collected and continuously discharged from the collector 14. In the form illustrated, a disc of about 36" in diameter is preferred and may be driven from a low speed of 800 R. P. M. to a high speed of 1200 R. P. M. At this speed and with a pitch or outward upward inclination of 7° to 10° on the attenuating surface, there is sufficient pressure on and travel of the material to make a film which is sufficiently thin so that even any sizeable colloidal particles are squeezed, wetted and dispersed in the film.

Ordinarily, the disc 2 and collector 14 are rotated in the same direction and at substantially the same speeds. However, the disc 2 may be rotated in the opposite direction, in which case there is a tendency for a greater contacting of the material within the casing.

In Figure 2 there is illustrated the manner in which the apparatus is used in the production of soap. As there illustrated, hot oil is pumped through a suitable line 30 to a common feed line 31, by means of a motor driven pump 32. Concurrently, molten fatty acid is pumped from a feed line 33 to the common feed line 31 by a suitable motor driven pump 34. The line 31 in turn is connected to the inlet line 7 of the apparatus above described. Since the caustic used to manufacture the soap would saponify the hot oil and fatty acids in the feed line 31, the caustic solution is pumped from a suitable feed line 35 into the feed line 8 above described by means of a motor driven pump 36. Thus the molten fatty acid and hot oil in roughly mixed condition are discharged beneath the spreader 9 and the caustic solution is likewise discharged separately beneath the spreader 9. The material is passed through the apparatus herein described, in stages. For example, three units of the apparatus are used and designated A, B and C, respectively. The first unit A is operated at high speed and the line 10 thereof may be connected to a source of vacuum, or if the materials are to be gas treated, to the source of treating gas. In this, the first stage, deaeration and dehydration are relatively-unimportant as only the intimate intermixture of the ingredients is desired. The mixture passes through this stage in the liquid phase. The resultant liquid or highly plastic mixture leaves the unit A through its discharge line 22 and enters a duplicate unit B, which is operated at the lower speed, preferably about 800 R. P. M., and the line 10 thereof is connected to a source of high subatmospheric pressure. The material having left the first stage as a liquid is additionally mixed in the second stage and the excess water of reaction is removed through the line 10. The material leaves the second stage or unit B as a heavy viscous mass through its discharge line 22. In the third stage the material is passed through unit C which is operated at high speed, or about 1200 R. P. M., and maintained under subatmospheric pressure. In the unit C, final deaeration and dehydration are effected, all entrapped air and water being removed. In the last stage the soap passes from a liquid to a solid or semi-solid form and is discharged through the line 22 of the unit C due to the peripheral velocity of the material as it strikes the scoop 21 of the unit. This requires a peripheral speed of about 150 feet per second. Thus the material first is rendered wholly or partially immiscible without deareation and without the application of any additional heat and solely by attenuation; it is next dehydrated to remove the excess water of reaction; and finally it is deaerated and dehydrated to remove the entrapped air and water vapor after which it passes to a suitable packaging stage 23.

Other modes of applying the principle of the invention may be employed, change being made as regards the details described, provided the features stated in any of the following claims or the equivalent of such be employed.

I therefore particularly point out and distinctly claim as my invention:

1. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable coaxial open top collector surrounding the member in outwardly spaced relation and having a peripheral trough portion open toward the member for receiving the material projected therefrom, and means for rotating the member and collector.

2. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable coaxial open top collector surrounding the member in outwardly spaced relation and having a peripheral trough portion open toward the member for receiving the material projected therefrom, and means having an inlet in the trough portion facing against the direction of rotation thereof, and having a discharge outside of the trough, for collecting and discharging the material from the trough portion, and means for rotating the member and collector.

3. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable coaxial open top collector surrounding the member in outwardly spaced relation and having a peripheral trough portion open toward the member for receiving the material projected therefrom, means enclosing said member and collector and in communication with the said coaxial collector, means for maintaining a predetermined pressure condition in the last mentioned means, and means for rotating the member and collector.

4. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable open top container surrounding and in coaxial relation to the member and having an inwardly open peripheral trough spaced outwardly from the member, said container having an opening at one end substantially coextensive radially with the member, means for maintaining a predetermined gaseous pressure condition at said open end, and means to rotate said member and said container.

5. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable coaxial open top collector surrounding the member in outwardly spaced relation and having a peripheral trough portion open toward the member for receiving the material projected therefrom, and means for maintaining a predetermined gaseous pressure condition within said coaxial collector.

6. An apparatus for the purposes described and comprising a casing, centrifugating member therein having a frusto-conical material supporting and conveying surface with a slope of from 5° to 20° upwardly from center to the periphery, means to feed material to the surface in the form of a continuous film in inwardly spaced relation to the outer periphery of the surface, means to rotate said member, and open top means to collect material centrifugally discharged from said surface.

7. In an apparatus for the purposes described, an upright drive shaft, a housing rotatably supporting the shaft, a centrifugating disc member on and coaxial and rotatable with the shaft, a spreader carried by the housing adjacent to the upper surface of the disc, said housing having an inlet opening and having a discharge opening beneath the spreader for admitting materials to the said surface in the form of a film, a hollow drive shaft coaxial with the first shaft, an open top collector on and coaxial and rotatable with the hollow shaft and having a trough portion surrounding and opening toward the disc member and spaced outwardly therefrom, a stationary tubular collector extending through the hollow shaft and into the trough portion, and having an open end portion in the trough portion and facing against the direction of rotation thereof, and means for rotating said shafts.

8. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable coaxial open top collector surrounding the member in outwardly spaced relation and having a peripheral trough portion open toward the member for receiving the material projected therefrom, and means for rotating said member and collector in opposite directions.

9. An apparatus for the purposes described comprising, a centrifugating member having an annular material supporting and conveying surface of which the generating element has an appreciable axial component smaller than its radial component, means for feeding material to the inner margin of said surface in the form of a continuous film, a rotatable coaxial open top collector member surrounding the first member in outwardly spaced relation and having a peripheral trough portion open toward the first member for receiving the material projected therefrom, and means for rotating said members, and means for varying the speed of rotation of at least one of the members.

10. An apparatus for the purposes decribed comprising, a casing, a rotatable member therein having an annular material supporting and conveying surface of which a genertaing element has a radial component and a lesser axial component, means for feeding different materials separately, but simultaneously, to the inner margin of said surface, means for rotating the member, and open top means for collecting the materials projected from the member.

11. The method of forming soap comprising continuously mixing the oil, fatty acid, and a caustic solution by centrifugally attenuating at high speed the rough mixture thereof into a film, continuously collecting the mixed material film and removing it by centrifugal force and then centrifugally attenuating it at a lower speed while subjecting it to subatmospheric pressure to vaporize and remove the water of reaction, continuously collecting the mixed material and removing it by centrifugal force and then centrifugally attenuating it to a film while subjecting it to subatmospheric pressure, until the material in the film changes into a semi-solid state.

12. In apparatus of the character described, the combination of a rotatable coniform member adapted to centrifugally attenuate flowable material fed centrally thereto and to centrifugally discharge such material at its periphery, a rotatable open top collector member coaxial with said first member and provided with a peripheral trough adjacent the periphery of said first member in which the material discharged from said first member is collected, means rotating said members, and an unloading scoop extending into said trough.

MEAD CORNELL.

REFERENCES CITED

The following references are of record in the file of this patent:

UNITED STATES PATENTS

| Number | Name | Date |
|---|---|---|
| Re. 14,331 | Parker | July 24, 1917 |
| 288,732 | Petersen | Nov. 20, 1883 |
| 315,876 | Zimmer | Apr. 14, 1885 |
| 529,663 | Naylor, Jr. | Nov. 20, 1894 |
| 622,408 | Aspinall et al. | Apr. 4, 1899 |
| 1,050,622 | De Raasloff et al. | Jan. 14, 1913 |
| 1,338,996 | Norcross | May 4, 1920 |
| 1,447,898 | Schlossstein | Mar. 6, 1923 |
| 1,634,245 | Jones et al. | June 28, 1927 |
| 1,723,329 | Chadburn | Aug. 6, 1929 |
| 2,300,750 | Scott | Nov. 3, 1942 |
| 2,318,293 | Cornell | May 4, 1943 |
| 2,341,536 | Fash | Feb. 15, 1944 |
| 2,428,895 | Shoeld | Oct. 14, 1947 |

UNITED STATES PATENTS

| Number | Name | Date |
|---|---|---|
| 17,752 | Great Britain | Sept. 8, 1894 |
| 154,038 | Great Britain | Nov. 25, 1920 |
| 204,046 | Great Britain | Feb. 21, 1924 |
| 360,141 | Italy | June 13, 1938 |